US010578735B2

(12) United States Patent
Stevens et al.

(10) Patent No.: US 10,578,735 B2
(45) Date of Patent: Mar. 3, 2020

(54) MULTILOOK COHERENT CHANGE DETECTION

(71) Applicant: Thales Holdings UK Plc, Berkshire (GB)

(72) Inventors: Malcolm Stevens, West Sussex (GB); Richard Stroud, West Sussex (GB)

(73) Assignee: THALES HOLDINGS UK PLC, Berkshire (GB)

( * ) Notice: Subject to any disclaimer, the term of this patent is extended or adjusted under 35 U.S.C. 154(b) by 253 days.

(21) Appl. No.: 15/678,898

(22) Filed: Aug. 16, 2017

(65) Prior Publication Data

US 2018/0059238 A1    Mar. 1, 2018

(30) Foreign Application Priority Data

Aug. 23, 2016    (GB) .................................. 1614370.3

(51) Int. Cl.
*G01S 13/90*    (2006.01)
(52) U.S. Cl.
CPC .................................... *G01S 13/90* (2013.01)
(58) Field of Classification Search
CPC ...................................................... G01S 13/90
See application file for complete search history.

(56) References Cited

U.S. PATENT DOCUMENTS 9,239,384 B1 *   1/2016  Chow ................ G06K 9/00637
9,523,768 B1 * 12/2016  Rincon .............. G01S 13/9023

| 10,042,048 B1 * | 8/2018 | Moya ................. G01S 13/9029 |
| 2008/0100510 A1 * | 5/2008 | Bonthron ............... G01S 7/024 342/373 |
| 2010/0259653 A1 * | 10/2010 | Kimura ................ G09G 3/3406 348/252 |

(Continued)

FOREIGN PATENT DOCUMENTS

WO    2010070261 A1    6/2010

*Primary Examiner* — Mamadou L Diallo
(74) *Attorney, Agent, or Firm* — Jeffri A. Kaminski; Venable LLP (57) ABSTRACT

Methods and devices use information from the original SAR images to provide measurements that can be applied to corresponding change detection products. This produces reliable registration and alignment for the change products even when the imaging geometry is significantly changed. A method of processing synthetic aperture radar, SAR, image data comprising a plurality of frames of SAR image data for each of a plurality of image geometries; for each image geometry, applying change detection to the frames of SAR image data corresponding to that image geometry to produce a corresponding plurality of change products; selecting a plurality of said acquired frames as reference frames, one in respect of each image geometry; applying a multilook SAR process to the reference frames to produce a multilook SAR product, the multilook SAR process comprising at least one processing stage comprising measuring a property of the data contained in the reference frames and applying a transformation to the data governed by the measured property; and applying a multilook change process to the change products, the multilook change process comprising applying the same transformation as in the multilook SAR process, to the change products, to produce a multilook change product.

19 Claims, 6 Drawing Sheets

(56) References Cited

U.S. PATENT DOCUMENTS

| | | | |
|---|---|---|---|
| 2012/0069238 A1* | 3/2012 | Toyomura | H04N 5/23232 |
| | | | 348/340 |
| 2013/0064467 A1* | 3/2013 | Abraham | G01S 7/295 |
| | | | 382/254 |
| 2016/0005158 A1* | 1/2016 | Asano | H04N 5/349 |
| | | | 382/154 |
| 2016/0061948 A1* | 3/2016 | Ton | G01S 13/885 |
| | | | 342/22 |
| 2017/0135583 A1* | 5/2017 | Blodgett | A61B 5/0066 |
| 2017/0188990 A1* | 7/2017 | Von Allmen | A61B 5/153 |
| 2017/0193635 A1* | 7/2017 | Zhao | G06T 5/50 |

* cited by examiner

MULTILOOK COHERENT CHANGE DETECTION

CROSS-REFERENCES TO RELATED APPLICATIONS

This application claims the benefit of GB Patent Application No. 1614370.3, filed 23 Aug. 2016, which is hereby incorporated by reference in its entirety.

FIELD

Embodiments disclosed herein relate to post-processing of image data, such as produced by a synthetic aperture radar.

BACKGROUND

Coherent change detection (CCD) is a technique employed to post-process a set of synthetic aperture radar (SAR) images obtained from substantially the same observation point, to generate a change product. A change product is an image showing changes between successive images of a region of interest. A change product can be useful in two ways. Firstly, it can provide a visual cue to an image analyst as to changes in the region of interest, possibly for further investigation. Secondly, if a change product is expressed as data, it can be used by computer apparatus as the basis for a decision to take a particular action based on the detection of change in a change product image of a region of interest.

CCD is sufficiently accurate to enable detection of subtle changes from one SAR image to the next. For instance, if a region of interest comprises terrain, vehicle tracks imparted in the terrain may be detected in this manner.

However, in certain circumstances, deficiencies may be encountered in a change product. Such deficiencies can include some or all of the following:

Lower resolution than the input SAR images, due to reliance on smoothing;
Significant amounts of speckle;
Smearing of wind-blown clutter;
Long shadows at low grazing angles;
Poor performance around bright reflectors and sidelobes;
Poor signal to noise ratio.

These deficiencies, if encountered, can reduce the usefulness of a change product. An image generated from a change product would in typical implementations be used by an image analyst, to interpret the change data and from that to make inferences about the observed region of interest. A change product exhibiting some or all of the above deficiencies would have diminished usefulness to an image analyst. The image analyst, using a deficient change product, may be unable to detect and identify relevant change artefacts in a change product. This may unduly affect the efficiency of the image analyst and may require the collection of further image data.

Similar deficiencies to those described for SAR change detection products may also be encountered in SAR imagery. Multilook processing of SAR imagery collected with large changes to the imaging geometry can be used as a mitigation for all of these deficiencies, relying on structure evident in the SAR images to allow registration and alignment to produce a multilook SAR image. This is referred to as multi-aspect multilook processing. However, the standard multilook SAR techniques used hitherto cannot be directly applied to change products, such as CCD, which typically have insufficient statistical correlation to facilitate the required measurements.

Constraining the imaging geometry, so that all the images are collected with a common collection geometry, would allow standard change detection processing to register and align multiple images to produce change detection products that can be combined. However this would only alleviate poor signal to noise ratios leaving the other deficiencies unaltered.

STATEMENTS OF INVENTION

In general terms, embodiments described herein use information from the original SAR images to provide measurements that can be applied to corresponding change detection products. This method produces reliable registration and alignment for the change products even when the imaging geometry is significantly changed.

According to an embodiment is a method of processing synthetic aperture radar, SAR, image data comprising a plurality of frames of SAR image data for each of a plurality of image geometries. The method comprises:

for each image geometry, applying change detection to the frames of SAR image data corresponding to that image geometry to produce a corresponding plurality of change products;

selecting a plurality of said acquired frames as reference frames, one in respect of each image geometry;

applying a multilook SAR process to the reference frames to produce a multilook SAR product, the multilook SAR process comprising at least one processing stage comprising measuring a property of the data contained in the reference frames and applying a transformation to the data governed by the measured property; and applying a multilook change process to the change products, the multilook change process comprising applying the same transformation(s) as in the multilook SAR process, to the change products, to produce a multilook change product.

SAR image data may comprise a plurality of frames, or images, from a plurality of different image geometries. These different image geometries are a result of the relative movement of the radar with respect to the object to be imaged.

If an object is imaged by a SAR system at two different times, a plurality of frames of SAR image data for each of a plurality of image geometries may be obtained. This image data therefore comprises multiple images of the object with the same image geometry (i.e. from the same relative position), but at a different time.

A change detection algorithm, such as a coherent change detection (CCD) algorithm, can be used to produce data which determines and highlights the differences between two images. The first image of each pair is defined as the change detection reference. A change product—for example in the form of a further frame—can be derived from the CCD algorithm. A change product for a specific image geometry may identify the changes that have occurred between the two frames being taken.

A multilook SAR process may be a post-processing algorithm in which a multilook SAR product is formed from a plurality of selected reference frames taken at substantially the same time but with a plurality of different image geometries. This multilook SAR product may be a composite image. The multilook SAR product may be of a higher quality than the original frames. A master image for the multilook SAR processing may be selected from the set of reference frames.

A multilook SAR process comprises at least one processing stage. The processing stage comprises measuring a property of the data contained in the reference frames and applying a transformation to the data governed by the measured property.

In an embodiment, the measuring of a property of the data is done with respect to all of the reference frames. A transformation is applied to each of the reference frames. The transformation may be suitable for being applied to frames associated with the same image geometry as the reference frame.

The multilook SAR process uses a measured property to determine if, or the extent, of transformation required for a specific reference frame. The measured property may be used to determine the transformation applied to the specific reference frame.

Measured property data, and/or data relating to the transformation applied to a reference frame, may be stored in a storage device.

Examples of property measurements and transformations include geometric calculations using SAR image metadata such as slant-to-plan conversion, rotation and/or deskew to compensate for squint angle and orthorectification, either to a flat plane or to digital terrain elevation data. Further examples include coarse registration offset between images (pixel offset in each axis) and fine alignment of local variation.

A multilook change process may be applied to change products to produce a multilook change product. A multilook change product may be a composite image and may have a higher quality than the original change products.

A multilook change process comprises at least one processing stage. The processing stage of the multilook change process may be identical to the processing stage(s) of the multilook SAR process. A measurement stage of the multilook change process and a transformation used in the multilook change process may be identical to those of the multilook SAR process, but they may be applied to different data. As such, the multilook change process may comprise applying the same transformation to the data as applied in the multilook SAR process.

The measured property and/or the transformation of the multilook SAR process, used to produce a multilook SAR product from a plurality of reference frames, may be used to produce a multilook change product from change products corresponding to the reference frames.

Measurements obtained as part of the multilook SAR process may be used to determine transformations for the multilook change process.

Transformations from the multilook SAR process may be the transformations for the multilook change process. Transformations from the multilook SAR process may be part of, or used to determine, transformations of the multilook change process.

A first transformation used on a reference image with a first image geometry may be applied to the change product for the first image geometry. A second transformation used on a reference image with a second image geometry may be applied to the change product for the second image geometry.

A multilook change product has improved signal-to-noise ratio, contrast and sharpness, reduced speckle, smearing and shadowing and a reduced contribution of bright features and sidelobes.

The multilook SAR process and the multilook change process may be applied substantially simultaneously, or in parallel.

Application of the multilook SAR process may comprise calculating, for each selected reference frame, an orthorectified pixel position map, and resampling the or each frame associated with the image geometry of the reference frame using the orthorectified pixel position map, wherein the applying of the multilook change process comprises applying a resampling to the change products using the orthorectified pixel position maps.

Application of the multilook SAR process may further comprise, for each reference frame, measuring the or each other frame associated with the same image geometry to determine a set of bulk offset measurements, and applying the bulk offset measurements to the or each other frame to obtain a set of coarsely adjusted image frames, and wherein the applying of the multilook change process comprises applying to each change product the respective set of bulk offset measurements applicable to that change product.

Application of the multilook SAR process may further comprise, for each reference frame, measuring the or each other frame associated with the same image geometry to determine a set of distortion and/or surface fit coefficients for the or each other frame, and applying the distortion and/or surface fit coefficients to obtain aligned image frames, and wherein the applying of the multilook change process comprises applying the distortion and/or surface fit coefficients to their respective change products to obtain aligned change product files.

Application of the multilook SAR process may comprise: calculating, for each selected reference frame, an orthorectified pixel position map, and resampling the or each frame associated with the image geometry of the reference frame using the orthorectified pixel position map, for each reference frame;

for each reference frame, measuring the or each other frame associated with the same image geometry to determine a set of bulk offset measurements, and applying the bulk offset measurements to the or each other frame to obtain a set of coarsely adjusted image frames;

for each reference frame, measuring the or each other frame associated with the same image geometry to determine a set of distortion and/or surface fit coefficients for the or each other frame, and applying the distortion and/or surface fit coefficients to obtain aligned image frames; and and wherein the applying of the multilook change process comprises determining a data transform equivalent to the resampling, the applying the bulk offset measurements, and the applying the distortion and/or surface fit coefficients, and applying the equivalent transform to the change products to obtain aligned change product files.

The method may further comprise integrating said aligned image frames to produce a multilook SAR product file.

The method may comprise integrating some, or all, of said aligned image frames to produce a multilook SAR product file.

The method may further comprise integrating said aligned change product files to produce a multilook change product file.

The method may comprise integrating some, or all, of said aligned change product files to produce a multilook change product file.

According to a further embodiment of the present invention is a data processor for processing synthetic aperture radar, SAR, image data, the image data comprising a plurality of frames of SAR image data for each of a plurality of image geometries; the data processor comprising:

a change detection unit operable to apply change detection to the frames associated with each of said image geometries, to produce a change product for each image geometry;

a reference frame selector operable to select a reference frame, in respect of each image geometry, from the acquired frames associated with that image geometry;

a multilook SAR processor operable to process the reference frames to produce a multilook SAR product, the multilook SAR processor comprising one or more processing stages, each processing stage comprising a measurement unit operable to take a measurement based on the reference frames and a configurable processing unit, the processing unit being configurable on the basis of the measurement; and a multilook change processor operable to process the change products to produce a multilook change product, the multilook change processor being operable to process the change products so as to match the processing of the multilook SAR processor.

The data processor may be a data processing unit. A data processor or data processor unit may further comprise a storage device configured to store executable instructions. The data processor may be configured to, when executing the instructions, undertake a method as described herein.

The data processor may be configured to undertake a method as described herein. As such, any discussion relating to method steps according to an embodiment described herein may apply to the corresponding data processor features, mutatis mutandis.

The change detection unit may be operable to apply change detection as described herein. The change detection unit may further comprise a storage device configured to store executable instructions. The change detection unit may be configured to, when executing the instructions, apply change detection as described anywhere herein.

The reference frame selector may be operable to select reference frames as described anywhere herein. The reference frame selector may comprise a storage device configured to store executable instructions. The reference frame selector may be configured to, when executing the instructions, select reference frames as described anywhere herein.

The multilook SAR processor may be operable to apply a multilook SAR process as described anywhere herein. The multilook SAR processor may comprise a storage device configured to store executable instructions. The multilook SAR processor may be configured to, when executing the instructions, apply a multilook SAR process as described anywhere herein.

The multilook SAR processor, or the processing unit thereof, may be configured to, or may comprise a transform unit operable to, apply a transformation to the reference frames governed by the measurement or measured property.

The multilook change processor may comprise a transform unit operable to apply a transformation to the change products. The transformation may be governed by the measurement or measured property. The transformation may be the same transformation as applied by the multilook SAR processor.

The multilook change processor may be operable to apply a multilook change process as described anywhere herein. The multilook change processor may comprise a storage device configured to store executable instructions. The multilook change processor may be configured to, when executing the instructions, apply a multilook change process as described anywhere herein.

The multilook SAR processor may comprise a pixel position mapper operable to calculate, for each selected reference frame, an orthorectified pixel position map, and a resampler operable to resample the reference frame using the orthorectified pixel position map, and wherein the multilook change processor comprises a corresponding resampler operable to resample the change products using the orthorectified pixel position maps.

The multilook SAR processor may further comprise a bulk offset measurer operable, for each reference frame, to measure the or each other frame associated with the same image geometry to determine a set of bulk offset measurements, and a bulk offset adjuster operable to apply the bulk offset measurements to the or each other frame to obtain a set of coarsely adjusted image frames, and wherein the multilook change processor comprises a corresponding bulk offset adjuster operable to apply to each change product the respective set of bulk offset measurements applicable to that change product.

The multilook SAR processor may further comprise an alignment determiner operable, for each reference frame, to measure the or each other frame associated with the same image geometry to determine a set of distortion and/or surface fit coefficients for the or each other frame, and an alignment applicator operable to apply the distortion and/or surface fit coefficients to obtain aligned image frames, and wherein the multilook change processor comprises a corresponding alignment applicator operable to apply the distortion and/or surface fit coefficients to their respective change products to obtain aligned change product files.

The multilook SAR processor may comprise:

a pixel position mapper operable to calculate, for each selected reference frame, an orthorectified pixel position map, and a resampler operable to resample the reference frame using the orthorectified pixel position map;

a bulk offset measurer operable, for each reference frame, to measure the or each other frame associated with the same image geometry to determine a set of bulk offset measurements, and a bulk offset adjuster operable to apply the bulk offset measurements to the or each other frame to obtain a set of coarsely adjusted image frames; and an alignment determiner operable, for each reference frame, to measure the or each other frame associated with the same image geometry to determine a set of distortion and/or surface fit coefficients for the or each other frame, and an alignment applicator operable to apply the distortion and/or surface fit coefficients to obtain aligned image frames;

wherein the multilook change processor is operable to acquire the orthorectified pixel position maps, the set of bulk offset measurements and the set of distortion and/or surface fit coefficients, the multilook change processor comprising a transform unit operable to apply a transform to the change products equivalent to the combined effect of the resampler, the bulk offset adjuster and the alignment applicator on the basis of the acquired orthorectified pixel position maps, the set of bulk offset measurements and the set of distortion and/or surface fit coefficients to obtain aligned change product files.

The data processor may further comprise an image frame integrator operable to integrate said aligned image frames to produce a multilook SAR product file.

The data processor may further comprise a change product integrator operable to integrate said aligned change product files to produce a multilook change product file.

According to a further embodiment is a computer program product comprising computer executable instructions which, when executed by a computer, cause the computer to become configured to perform a method as described herein.

According to a further embodiment is a non-transitory computer readable medium storing computer executable instructions which, when executed by a computer, cause the computer to become configured to perform a method as described herein.

DESCRIPTION OF SPECIFIC EMBODIMENTS

Figure 1:
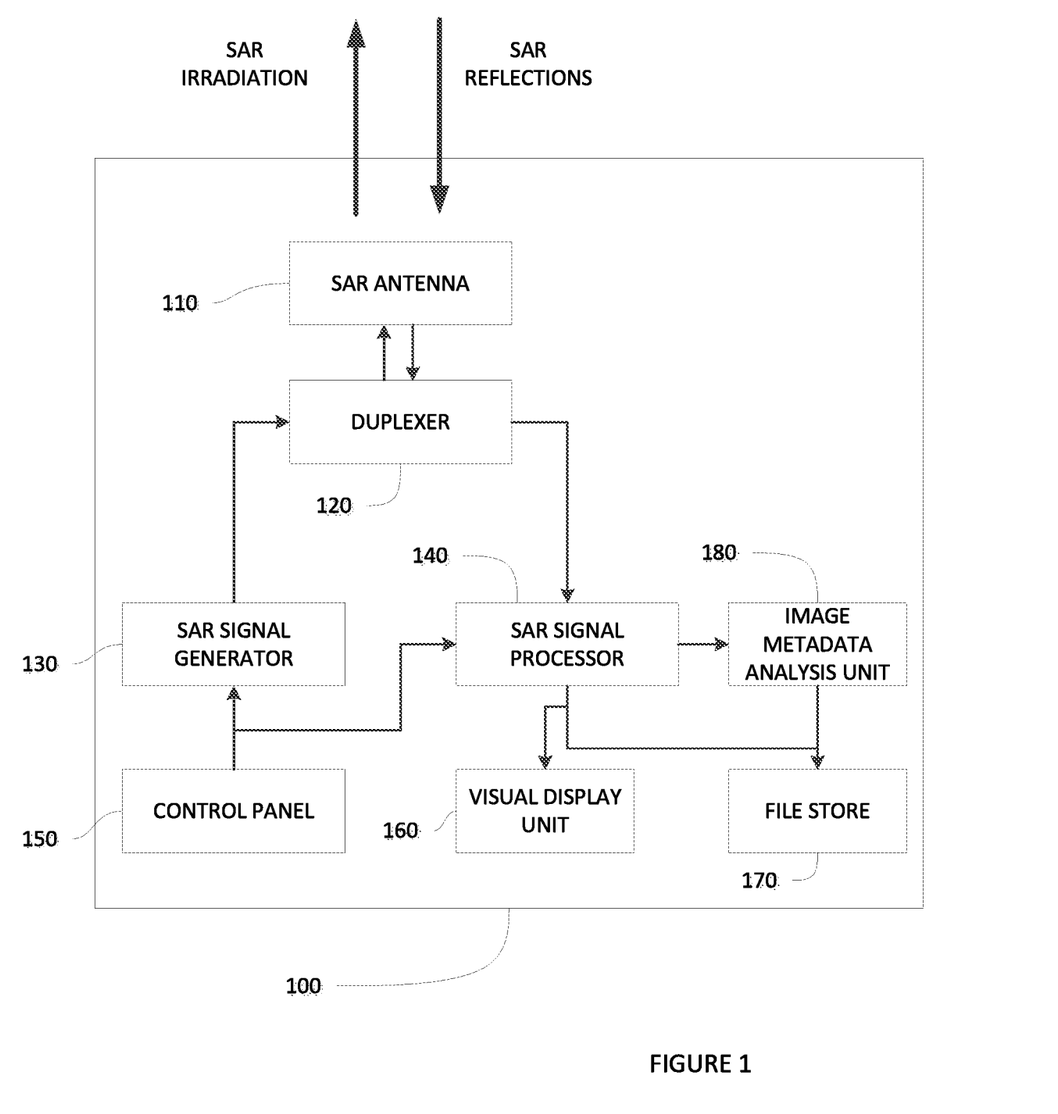
FIG. 1 is a schematic diagram of a synthetic aperture radar system in accordance with a described embodiment.

FIG. 1 illustrates a synthetic aperture radar (SAR) system 100, such as would be installed on an aircraft.

The SAR system 100 comprises an antenna 110 which is configured to operate in a selected one of two modes. In a transmit mode, the antenna 110 is operable to emit radio frequency (RF) electromagnetic radiation, in response to electrical driving signals. In a receive mode, the antenna 110 is operable to detect RF signals incident thereon, and to convert these into electrical detection signals.

A duplexer 120 provides a facility for availing the system 100 of these two modes of operation of the antenna 110. The duplexer 120 is operable to receive signals generated by an SAR signal generator 130, to drive the antenna array 110, and is operable to pass on signals, generated by the antenna 110 in receive mode, to an SAR signal processor 140. With correct configuration and control, the SAR signal processor 140 acts in synchronism with the SAR signal generator 130, such that the SAR signal processor is operable to detect and process signals which emanate from reflections in a region of interest illuminated by an SAR emission resultant from a signal generated by the SAR signal generator 130.

The SAR signal processor 140 is further operable to generate an SAR image file comprising the detected and processed signals. Additionally, the SAR signal processor 140 is operable to generate SAR image meta-data describing the imaging geometry associated with each SAR image file. The SAR image file and the associated meta data are stored in a file store 170.

The SAR signal generator 130 can be under the direction of an operator, making use of a control panel 150. The control panel 150 can be used to accept user input actions, to convert those user input actions into signals which can be used to modify the configuration of the SAR signal generator 130. Likewise, signals converted by the control panel 150 can be used to control configuration of the SAR signal processor 140.

Output from the signal processor 140 can be used to develop a visual display output at a visual display unit (VDU) 160. As noted above, output from the signal processor 140 is also stored in the file store 170, along with the accompanying SAR image meta-data.

As illustrated in FIG. 1, the SAR image meta-data may be analysed by an image meta-data analysis unit 180, prior to storage in the file store 170. As described in further detail below, the image meta-data analysis unit 180 is operable to group SAR image files for storage in a particular directory of the file store 170. The image meta-data analysis unit 180 analyses the SAR image meta-data associated with each SAR image file in order to determine the image geometry from which the SAR image file was acquired, and group SAR image files with similar image geometries. The grouping of SAR image files can be determined by the image meta-data analysis unit 180 or, in an alternative embodiment, may be predetermined based on operator input via the control panel 150.

In certain embodiments, the image meta-data analysis unit 180 may be dispensed with altogether, particularly if the data captured by the SAR signal processor 140 is so orderly that it can be stored in the file store 170 without additional processing.

Other additional and/or alternative input and output configurations are not excluded by this disclosure.

Figure 2:
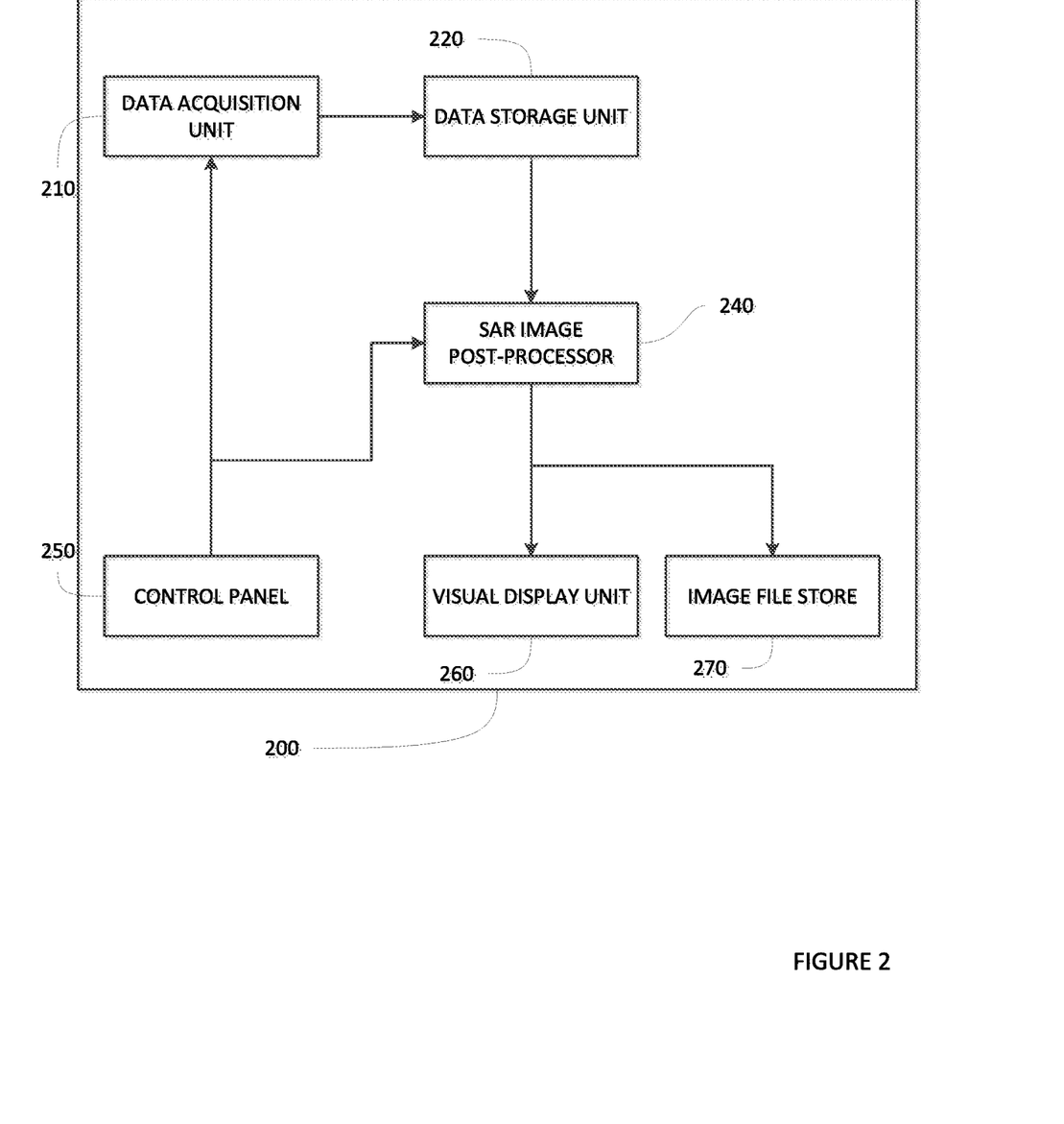
FIG. 2 is a schematic overview of inputs to and outputs from a SAR image post-processor.

FIG. 2 shows an SAR image data processing console 200 for processing information acquired by the SAR system 100 illustrated in FIG. 1.

A data acquisition unit 210 is provided. This is implemented to acquire SAR signal data. In this embodiment, the data acquisition unit 210 is operable to receive information from the file store 170. This can be achieved in a number of ways, all within the scope of the embodiment. For example, the file store 170 could be in the form of a removable storage medium, such as a drive, a memory card, a memory stick, or the like, which can be inserted into a compatible receptacle of the data acquisition unit 210 or connectable thereto.

Further, transfer of data from the file store 170 to the data acquisition unit 210 could be effected by data link. Such a data link could be by way of Ethernet or other suitable wired connection, or by wireless connection such as WiFi.

The above scenarios are particularly suited to data transfer when the aircraft bearing the SAR system 100 is at base. Other scenarios may arise, enabling in-air data transfer. For example, a wireless data link could be established between the SAR system 100 and the console 200. This data link could be established with a suitable layer of security to reduce risk of data corruption or interception.

A data storage unit 220 is operable to store data received by the data acquisition unit 210.

An SAR image post-processor 240 receives SAR image data from the data storage unit 220.

A control panel 250 and a visual display unit 260 provide a user interface for configuration and control of the system 200.

Figure 3:
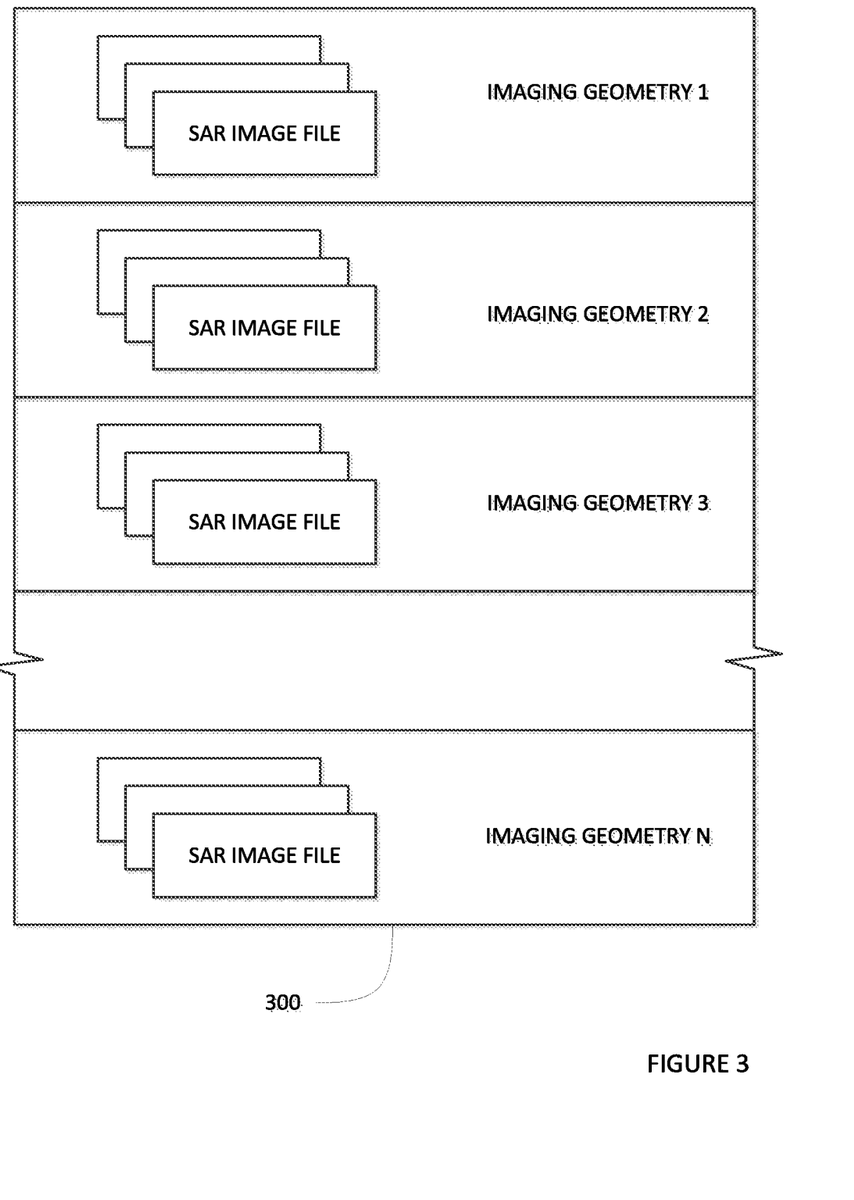
FIG. 3 is a schematic diagram of a data structure storing SAR image information for use in the aforementioned systems.

The data to be processed, as acquired from the file store 170, is arranged in the data storage unit 220 such that an SAR image file stores information pertaining to an image, and is stored with respect to the image geometry from which the image was acquired. FIG. 3 represents the organisation of this information in memory. For any particular imaging geometry, a plurality of SAR image files will be stored. As shown in FIG. 3, N imaging geometries are listed, each having a plurality of SAR image files associated therewith. This results in an SAR data structure 300 which will be used by the image post-processor 240.

There are several ways of associating an SAR image file with an imaging geometry. For example, a database could be used, with each imaging geometry linked to its associated SAR image files by means of tables. Alternatively, a physical data structure could be arranged, comprising formatting and reservation of a storage medium, for specific storage addresses to be used to associate particular data entities with each other. Alternatively and as described above, the SAR image meta-data associated with each SAR image file may be analysed in order to group SAR image files with similar imaging geometries. The grouping of SAR image files may be carried out by a specific unit such as the image meta-data analysis unit as described above, or alternatively may be grouped by, for example, the image data storage unit 220. SAR image files may be analysed in batch in order to compare imaging geometries and determine appropriate groupings. Alternatively, imaging geometries may be pre-set by an operator or determined based on an initial set of SAR image files, with which subsequent SAR image files are arranged in order to group SAR image files with substantially consistent imaging geometries. The particular means of achieving this association will be implementation specific.

Figure 4:
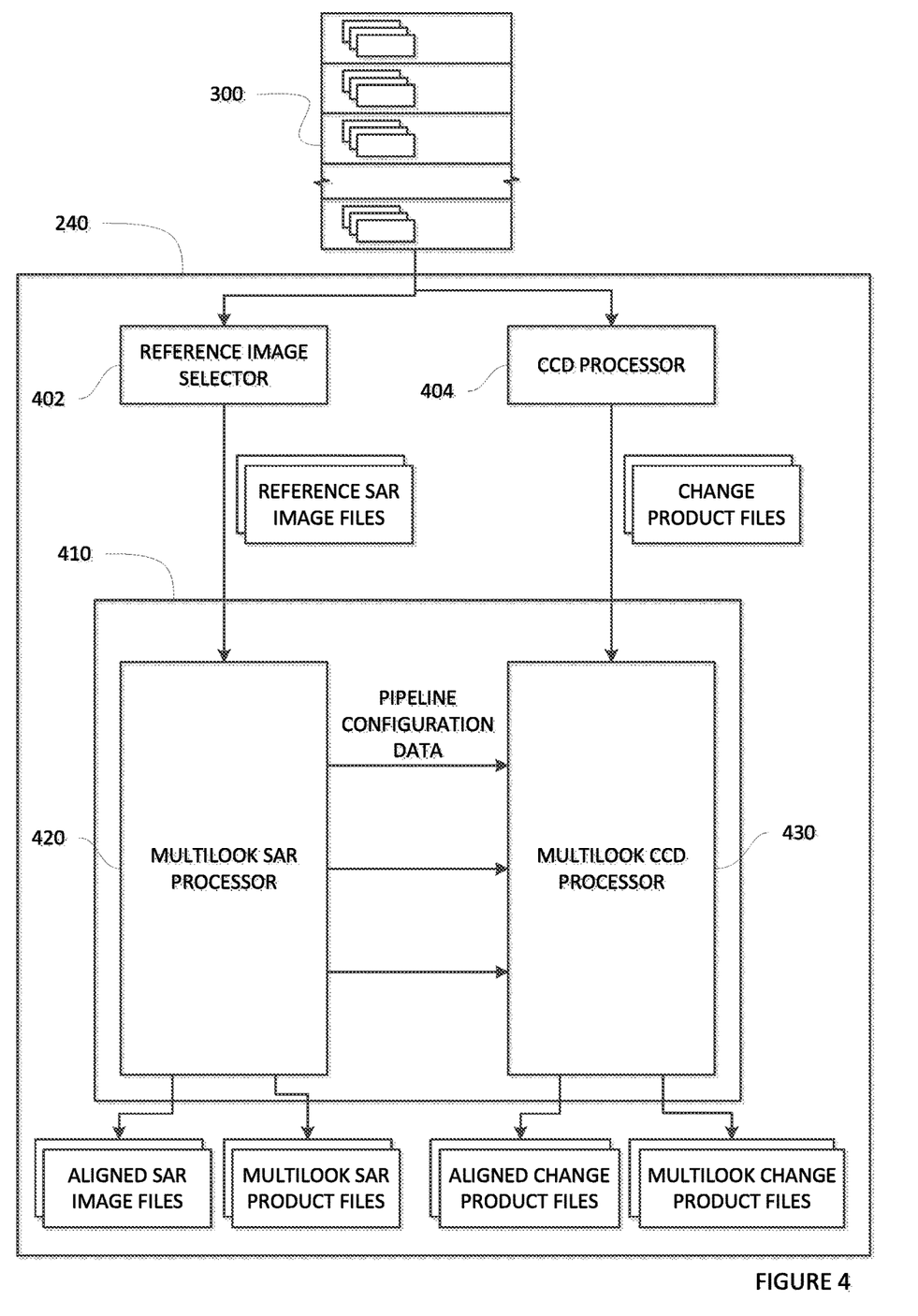
FIG. 4 is a schematic diagram of an SAR image post-processor implemented in the aforementioned systems.

As shown in FIG. 4, the SAR image post-processor 240 is operable to process SAR image files stored in the data storage unit 220 memory, for example the SAR image files stored in the image storage unit. As will be described in greater detail below, the SAR image post-processor 240 is operable to process the SAR image files and output the resultant post-processed images and data to a resultant image storage unit 270. The resultant post-processed images may also be output to a visual display unit 260.

It will be appreciated that the production of each change product file requires analysis of a minimum of two SAR image files. The analysis of more than two SAR image files could be combined to form a composite change product file but for the purposes of the embodiments described herein, each change product file will be considered the product of two SAR image files. The SAR image files may be retrieved or received from the image data storage unit 220.

Alternatively, one SAR image file may be retrieved or received from the image data storage unit 220 and a second SAR image file may be received directly from the SAR image processor 140 as described with reference to FIG. 1.

In an alternative embodiment, the SAR data acquisition process and the change data processing can be combined into a single unit, on board an aircraft. In that case, it may be convenient to combine the acquisition of SAR files and the processing thereof, and the reader will appreciate that certain intermediate storage and transfer elements as described above may be dispensed with.

For two SAR image files to be analysed to produce a change product file, a subsequent SAR image file is analysed with respect to a reference SAR image file. Therefore, there exists a temporal separation between the generation of the reference SAR image file and the subsequent SAR image file. As shown in FIG. 3, a plurality of SAR image files may be associated with each particular imaging geometry. The SAR image files associated with particular imaging geometries may be arranged in batches, with a specific temporal separation between subsequent batches. In the analysis of two SAR image files, the reference SAR image file and the subsequent SAR image file may be taken from consecutive batches. Alternatively, the subsequent SAR image file may be taken from any batch subsequent to the batch of the reference SAR image file. It will further be appreciated that it is not necessary for the reference SAR image file to precede the SAR image file with which it is analysed; however, for ease of reference the term "subsequent SAR image file" is used.

A control panel may also provide input from an operator to the SAR image post-processor. The control panel may permit the operator to, for example, select the reference SAR image file and the subsequent SAR image file.

As shown in FIG. 4, the data structure 300 is presented to the SAR image post-processor 240.

The SAR image post-processor 240 comprises a reference image selector 402 and a CCD (coherent change detection) processor 404. The data structure 300 is processed by these two units in parallel. The processing by the reference image selector 402 produces a plurality of reference SAR image files. The processing by the CCD processor 404 produces a plurality of change product files, corresponding to the reference SAR image files.

These reference SAR image files and change product files are passed to a data processing pipeline unit 410. The pipeline unit 410 defines two parallel pipelines, namely a multilook SAR processor 420 and a multilook CCD processor 430. In detail, the reference SAR image files are passed to the multilook SAR processor 420 and the change product files are passed to the multilook CCD processor 430. The multilook CCD processor 430 executes a processing pipeline configured by pipeline configuration data generated at various stages of a pipeline process executed by the multilook SAR processor 420, as will be described in due course.

The two pipeline processes, executed respectively by the multilook SAR processor 420 and the multilook CCD processor 430, cause the output of various files of data.

The multilook SAR processor 420 outputs a set of aligned SAR image files, and multilook SAR product files. Further, the multilook CCD processor 430 outputs a set of aligned change product files and a set of multilook change product files. The content and nature of these files will be explained in due course.

Figure 5:
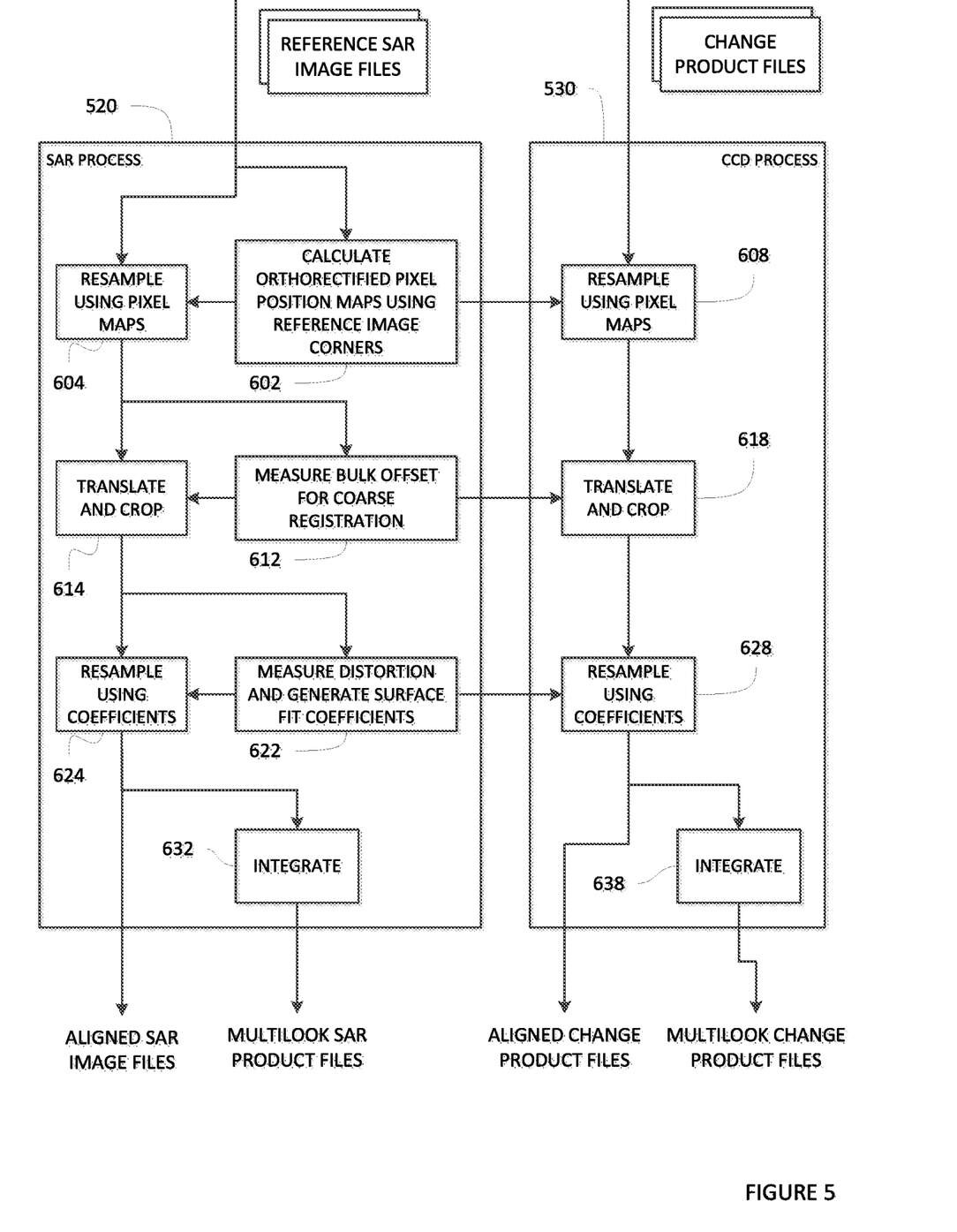
FIG. 5 is a first implementation of a processing pipeline for use in the SAR image post-processor of FIG. 4.

In further detail, FIG. 5 illustrates the two pipeline processes executed respectively by the multilook SAR processor 420 and the multilook CCD processor 430. For convenience, the two pipeline processes are labelled as SAR process 520 and CCD process 530 in FIG. 5.

The SAR process 520 commences with a pixel map calculation stage 602 comprising a calculation of orthorectified pixel position maps using reference image corners from the reference SAR image files. Orthorectification looks to reduce the effect of distortions existent in images due to, for example, terrain variability (such as the curvature of the earth). To explain, height changes within the scene will cause predictable distortions in the SAR imagery. Deliberate or unintentional changes in the flight path (such as the track angle or altitude) on subsequent image collections will cause these distortions to differ in the new images. Orthorectification aims to remove these geometric distortions. The pixel map calculation stage 602 therefore looks to produce a dataset describing divergences of the input image files and how these divergences should be corrected.

An associated resampling stage 604 resamples the reference SAR image files using the resultant pixel maps. The pixel maps are also output to the CCD process 530 as pipeline configuration data (as mentioned with reference to FIG. 4).

Then, in a second layer of the SAR process pipeline 520, the resampled image files are passed to a measurement stage 612, in which a bulk offset is measured for the resampled image files, for coarse registration of the images represented thereby. The resultant bulk offset data is then applied in an offsetting stage 614, in which the resampled image files are subjected to translations and crops, governed by the bulk offset data, to establish a coarse registration of the images represented in the image data files. This registration is carried out by reference to a selected one of the resampled image files. If the SAR device 100 is installed on an aircraft fuselage, the reference image file can be selected as the one which was captured closest to the broadside direction (that is, substantially perpendicular to the aircraft track vector). Thus, the purpose of registration is to align (initially coarsely) the other images represented by the image files, with the selected reference image file. So, the bulk offset data describes the offsets required to bring the SAR images into registration with the selected reference SAR image.

The same consideration, in respect of selecting the most appropriate reference image file, can be applied to an image set acquired from a satellite mounted SAR system.

The bulk offset data is also output to the CCD process 530 as pipeline configuration data.

In a third layer of the SAR process pipeline 520, the translated and cropped resampled image files are passed to a distortion measurement stage 622, which measures distortion of the images from one reference file to another, to generate surface fit coefficients.

These surface fit coefficients are used to configure a resampling stage 624 in which the translated and cropped resampled image files received from the preceding layer of the pipeline 520 are resampled, to create a set of aligned SAR image files, output from the pipeline 520.

The surface fit coefficients describe fine adjustments to the images to bring them into alignment and registration with each other.

The surface fit coefficients are also output to the CCD process 530 as pipeline configuration data.

An integration stage 632 also receives the aligned SAR image files, and integrates them to form a set of multilook SAR product files.

As will have been appreciated above, all of the layers of the SAR process pipeline 520 cause the emanation of pipeline process data, namely pixel maps from the first layer, bulk offset data from the second layer, and surface fit coefficients from the third layer.

These are fed to respective processing stages of the CCD process pipeline 530. The CCD process pipeline 530 comprises a resampling stage 608, functionally equivalent to the resampling stage 604 of the SAR process pipeline 520. This applies the same resampling process, to incoming change product files input to the CCD process pipeline 530.

The resampled change product files are then passed to an offsetting stage 618, functionally equivalent to the offsetting stage 614 of the SAR process pipeline 520. This applies the same translate and crop function to the resampled change product files, as is applied to the resampled reference SAR image files processed at that stage in the SAR process pipeline 520.

The resultant offset resampled change product files are then passed to a resampling stage 628, functionally equivalent to the resampling stage 624 of the SAR processing pipeline 520. This stage 628, configured by the surface fit coefficients generated by the distortion measurement stage 622, processes the offset resampled change product files to produce a set of aligned change product files.

An integration stage 638 also receives the aligned change product files, and integrates them to form a set of multilook change product files.

The reader will appreciate that the processing stages above are not essential as specified. Transformations that may be considered in embodiments include:

Geometric calculations using SAR image metadata, such as:
slant-to-plan conversion
rotation (and possibly de-skew) to compensate for squint angle
orthorectification, either to a flat plane or to digital terrain elevation data
Measurements made between pairs of SAR images, such as:
coarse registration offset between images (pixel offset in each axis)
fine alignment of local variation The key element of the described embodiment is that, for each transformation applied to the SAR image data, there is an equivalent transformation made to the corresponding change products.

While the execution of parallel pipeline processing has been exemplified by processing of CCD products, any process designed to establish a change product may be contemplated, such that transformations intended to rectify alignment of SAR images are also applied, alongside, to corresponding change products. Suitable alternatives to the aforementioned CCD approach include the higher resolution CCS change product offered by Thales, and non-coherent Amplitude Change Detection (ACD). Optionally, several different types of change product can be processed in parallel.

Figure 6:
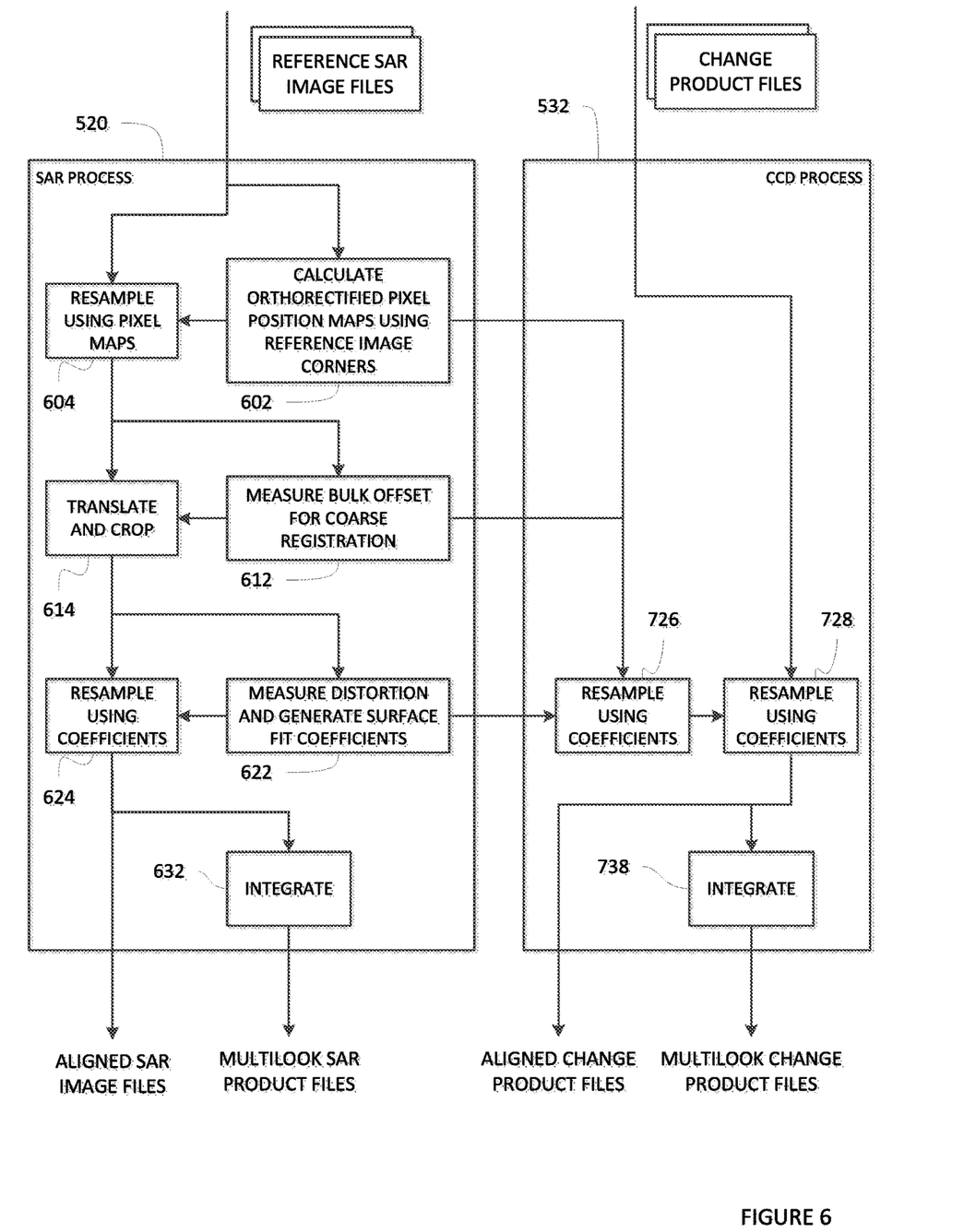
FIG. 6 is a second implementation of a processing pipeline for use in the SAR image post-processor of FIG. 4.

As an alternative to the approach shown in FIG. 5, FIG. 6 illustrates an implementation in which change products are resampled once, rather than several times over.

In this process, all features of the multilook SAR process pipeline 520 are replicated. The modifications to the process shown in FIG. 5 all apply to the multilook change process pipeline, now designated 532.

As shown, the change product files are now passed to a resampler stage 728 which receives a set of coefficients from a coefficient combiner stage 726. The coefficient combiner stage constructs a set of coefficients, to derive a transformation equivalent to the combined effect of the transformations undergone by the reference SAR images in the SAR image process 520. To do this, the coefficient combiner stage 726 receives the coefficients from each transformation stage 602, 612, 622 of the SAR process pipeline 520. The output of the resampler stage 728 is a set of aligned change product files. As before, an integration stage 738 also receives the aligned change product files, and integrates them to form a set of multilook change product files.

Implementations of this embodiment may exhibit a slight improvement in output image quality, and may also benefit from the removal of a requirement to hold the change products in memory during the whole process; they can be loaded once all of the alignment corrections have been generated.

Any of the above embodiments can be implemented, in practice, on a general purpose computer configured by suitable software. A software product could be introduced to the computer by any means, such as by a download, by introduction of a computer readable storage medium (such as a disk, a non-volatile memory card or electronic device), or by insertion, into a provided receptacle, of a suitable memory device such as a Read Only Memory device. It could also be implemented as a dedicated program storage facility of an originally equipped computer, such as an application specific processing device. The program facilities enabling the execution of program code to implement an embodiment could be provided externally, such as by way of a distributed storage facility, often referred to as a cloud based service.

Whilst certain embodiments have been described, these embodiments have been presented by way of example only, and are not intended to limit the scope of the inventions. Indeed, the novel apparatus and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method of processing synthetic aperture radar, SAR, image data comprising a plurality of frames of SAR image data for each of a plurality of image geometries;
    for each image geometry, applying change detection to the frames of SAR image data corresponding to that image geometry to produce a corresponding plurality of change products;
    selecting a plurality of said acquired frames as reference frames, one in respect of each image geometry;
    applying a multilook SAR process to the reference frames to produce a multilook SAR product, the multilook SAR process comprising at least one processing stage comprising measuring a property of the data contained in the reference frames and applying a transformation to the data governed by the measured property; and
    applying a multilook change process to the change products, the multilook change process comprising applying the same transformation as in the multilook SAR process, to the change products, to produce a multilook change product.

2. A method in accordance with claim 1 and wherein the applying of the multilook SAR process comprises calculating, for each selected reference frame, an orthorectified pixel position map, and resampling the or each frame associated with the image geometry of the reference frame using the orthorectified pixel position map, and wherein the applying of the multilook change process comprises applying a resampling to the change products using the orthorectified pixel position maps.

3. A method in accordance with claim 2 wherein the applying of the multilook SAR process further comprises, for each reference frame, measuring the or each other frame associated with the same image geometry to determine a set of bulk offset measurements, and applying the bulk offset measurements to the or each other frame to obtain a set of coarsely adjusted image frames, and wherein the applying of the multilook change process comprises applying to each change product the respective set of bulk offset measurements applicable to that change product.

4. A method in accordance with claim 3 wherein the applying of the multilook SAR process further comprises, for each reference frame, measuring the or each other frame associated with the same image geometry to determine a set of distortion and/or surface fit coefficients for the or each other frame, and applying the distortion and/or surface fit coefficients to obtain aligned image frames, and wherein the applying of the multilook change process comprises applying the distortion and/or surface fit coefficients to their respective change products to obtain aligned change product files.

5. A method in accordance with claim 1 and wherein the applying of the multilook SAR process comprises:
    calculating, for each selected reference frame, an orthorectified pixel position map, and resampling the or each frame associated with the image geometry of the reference frame using the orthorectified pixel position map, for each reference frame,
    for each reference frame, measuring the or each other frame associated with the same image geometry to determine a set of bulk offset measurements, and applying the bulk offset measurements to the or each other frame to obtain a set of coarsely adjusted image frames,
    for each reference frame, measuring the or each other frame associated with the same image geometry to determine a set of distortion and/or surface fit coefficients for the or each other frame, and applying the distortion and/or surface fit coefficients to obtain aligned image frames,
and wherein the applying of the multilook change process comprises determining a data transform equivalent to the resampling, the applying the bulk offset measurements, and the applying the distortion and/or surface fit coefficients, and applying the equivalent transform to the change products to obtain aligned change product files.

6. A method in accordance with claim 4 and further comprising integrating said aligned image frames to produce a multilook SAR product file.

7. A method in accordance with claim 4 further comprising integrating said aligned change product files to produce a multilook change product file.

8. A computer program product comprising computer executable instructions which, when executed by a computer, cause the computer to become configured to perform a method in accordance with claim 1.

9. A non-transitory computer readable medium storing computer executable instructions which, when executed by a computer, cause the computer to become configured to perform a method in accordance with claim 1.

10. A method in accordance with claim 5 and further comprising integrating said aligned image frames to produce a multilook SAR product file.

11. A method in accordance with claim 5 further comprising integrating said aligned change product files to produce a multilook change product file.

12. A data processor for processing synthetic aperture radar, SAR, image data, the image data comprising a plurality of frames of SAR image data for each of a plurality of image geometries;
    a change detection unit operable to apply change detection to the frames associated with each of said image geometries, to produce a change product for each image geometry;
    a reference frame selector operable to select a reference frame, in respect of each image geometry, from the acquired frames associated with that image geometry;
    a multilook SAR processor operable to process the reference frames to produce a multilook SAR product, the multilook SAR processor comprising one or more processing stages, each processing stage comprising a measurement unit operable to take a measurement based on the reference frames and a configurable processing unit, the processing unit being configurable on the basis of the measurement; and
    a multilook change processor operable to process the change products to produce a multilook change product, the multilook change processor being operable to process the change products so as to match the processing of the multilook SAR processor.

13. A data processor in accordance with claim 12 and wherein the multilook SAR processor comprises a pixel position mapper operable to calculate, for each selected reference frame, an orthorectified pixel position map, and a resampler operable to resample the reference frame using the orthorectified pixel position map, and wherein the multilook change processor comprises a corresponding resampler operable to resample the change products using the orthorectified pixel position maps.

14. A data processor in accordance with claim 12 wherein the multilook SAR processor further comprises a bulk offset measurer operable, for each reference frame, to measure the or each other frame associated with the same image geometry to determine a set of bulk offset measurements, and a bulk offset adjuster operable to apply the bulk offset measurements to the or each other frame to obtain a set of coarsely adjusted image frames, and wherein the multilook change processor comprises a corresponding bulk offset adjuster operable to apply to each change product the respective set of bulk offset measurements applicable to that change product.

15. A data processor in accordance with claim 13 wherein the multilook SAR processor further comprises an alignment determiner operable, for each reference frame, to measure the or each other frame associated with the same image geometry to determine a set of distortion and/or surface fit coefficients for the or each other frame, and an alignment applicator operable to apply the distortion and/or surface fit coefficients to obtain aligned image frames, and wherein the multilook change processor comprises a corresponding alignment applicator operable to apply the distortion and/or surface fit coefficients to their respective change products to obtain aligned change product files.

16. A data processor in accordance with claim 12 and wherein the multilook SAR processor comprises:

a pixel position mapper operable to calculate, for each selected reference frame, an orthorectified pixel position map, and a resampler operable to resample the reference frame using the orthorectified pixel position map, a bulk offset measurer operable, for each reference frame, to measure the or each other frame associated with the same image geometry to determine a set of bulk offset measurements, and a bulk offset adjuster operable to apply the bulk offset measurements to the or each other frame to obtain a set of coarsely adjusted image frames, and an alignment determiner operable, for each reference frame, to measure the or each other frame associated with the same image geometry to determine a set of distortion and/or surface fit coefficients for the or each other frame, and an alignment applicator operable to apply the distortion and/or surface fit coefficients to obtain aligned image frames, and wherein the multilook change processor is operable to acquire the orthorectified pixel position maps, the set of bulk offset measurements and the set of distortion and/or surface fit coefficients, the multilook change processor comprising a transform unit operable to apply a transform to the change products equivalent to the combined effect of the resampler, the bulk offset adjuster and the alignment applicator on the basis of the acquired orthorectified pixel position maps, the set of bulk offset measurements and the set of distortion and/or surface fit coefficients to obtain aligned change product files.

17. A data processor in accordance with claim 15 and further comprising an image frame integrator operable to integrate said aligned image frames to produce a multilook SAR product file.

18. A data processor in accordance with claim 17 further comprising a change product integrator operable to integrate said aligned change product files to produce a multilook change product file.

19. A data processor in accordance with claim 16 and further comprising an image frame integrator operable to integrate said aligned image frames to produce a multilook SAR product file.

* * * * *